US005751606A

United States Patent [19]

Migachyov et al.

[11] Patent Number: 5,751,606
[45] Date of Patent: May 12, 1998

[54] AUTOMATIC VALVE TEST APPARATUS

[75] Inventors: Valery Migachyov, San Antonio; Charles D. Colley, Universal City, both of Tex.

[73] Assignee: HK Medical Technologies Incorporated, San Antonio, Tex.

[21] Appl. No.: 642,635

[22] Filed: May 3, 1996

[51] Int. Cl.$^6$ ................................................. G01N 7/00
[52] U.S. Cl. ........................................ 364/558; 364/510
[58] Field of Search .................................. 364/509, 510, 364/558; 604/118, 119, 120; 73/168; 137/551, 557, 559

[56] References Cited

U.S. PATENT DOCUMENTS

5,331,548  7/1994  Rollema et al. ................... 364/413.02

*Primary Examiner*—James P. Trammell
*Attorney, Agent, or Firm*—Nawrocki, Rooney & Silvertson

[57] ABSTRACT

This apparatus is for testing valves, particularly those adapted for controlling incontinence. Microprocessor computer equipment and programs use specialized test programs and interface equipment to permit the operator to control, display and record a sequence of valve tests using screens, icons and keyboard entries. The tests are either directly computer controlled or computer directed. A manual mode permits the user to enter a specific valve test pressure versus time profile, while an automatic mode permits the user to have the profiles tests repeated automatically by the computer. Both modes provide liquid at controlled pressure to the valve under test and determines the valve's corresponding liquid output rates.

27 Claims, 13 Drawing Sheets

| AUTOCATH FUNCTIONAL TEST SUMMARY OF THE TEST |
| --- |

Part#: BCAHAFFPP-NN1  serial#: DDMMYYFFNNI  Date: 03-01-1996  user: Jeff

Test station ID: 01  scale ID: LT7200-ACCULAB1  Pressure sensor ID: PX:139005D4-VOMEGA02

| | CYCLE NUMBER | | | | | | | | | | AVERAGE |
|---|---|---|---|---|---|---|---|---|---|---|---|
| | 1 | 2 | 3 | 4 | 5 | 6 | 7 | 8 | 9 | 10 | |
| Low Flow Pressure cmH2O | 37.6 | 44.5 | 42.7 | 45.8 | 41.4 | 45.3 | 36.7 | 34.5 | 43.6 | 42.3 | 41.4 |
| Full Flow Pressure cmH2O | 43.6 | 47.9 | 48.8 | 46.6 | 42.7 | 43.6 | 41.9 | 46.2 | 42.7 | 44.5 | 44.9 |
| Closing Pressure cmH2O | 23.3 | 23.3 | 22.4 | 22. | 22.9 | 22.9 | 21.1 | 22.4 | 22.9 | 22.9 | 22.6 |
| Volume cc | 776.8 | 780.1 | 783.8 | 775.3 | 778.5 | 783.3 | 783. | 782.7 | 802.1 | 782.8 | 782.8 |
| Average Flow Rate cc/s | 14. | 14. | 14.3 | 14.1 | 14.3 | 14.1 | 14. | 13.9 | 14.2 | 14.1 | 14.1 |
| Max Flow Rate cc/s | 19.6 | 19.5 | 19.7 | 19.8 | 19.7 | 19.7 | 20. | 19.7 | 19.7 | 19.7 | 19.7 |

Highlighted values Are out of specification

Low Flow Pressure Limits   Full Flow Pressure Limits          Closing Pressure Limits
   35.     55.                 50.      75.                      10.      28.

Minimum Max Flow Rate:    10.

[Save and Exit]  [Save]   [Print]   [Continue]   [Exit]

AUTOMATIC VALVE TEST APPARATUS

FIELD OF THE INVENTION

This invention relates to apparatus for testing valves automatically with the minimum of operator intervention. More specifically, this invention relates to computer controlled apparatus which applies controlled pressures to the valve under test, measures the resulting flow rates, and displays and stores the input pressures and flow rates.

BACKGROUND OF THE INVENTION

The use of valves to control incontinence is known in the art. Valves used for this application must function reliably under adverse biological conditions with small operating forces. Obtaining these desired valve characteristics requires accurate testing.

While a number of test procedures are known and used for testing valves in general, there is no automatic test apparatus arranged to specifically test the required characteristics of valves for use in the control of incontinence. An automated test which would provide controlled, repeatable input pressures to a valve, measure the resulting output flow from the valve, accurately repeat the tests a given number of times, and average the tests results for improved test accuracy is desirable.

SUMMARY OF THE INVENTION

This apparatus tests valve output flow rates as a function of input pressures which change in a predetermined pattern over time. The tests are directed particularly to valves used to control incontinence. The tests are performed under computer control, either by the user manually entering desired test pressures into the computer, or automatically under direct computer control.

The computer used can be a Pentium™ type computer with conventional keyboard, monitor, mouse, printer, recording apparatus and Windows operating system. This equipment and program permit the use of an icon type selection approach to call up a succession of screens for the various operations provided by a variety of specialized programs, and to use either a mouse or keyboard entries to call up additional operational functions.

Specialized interface equipment between computer and the test equipment are also part of this apparatus. The specialized test programs provide capability for: controlling the tests, data acquisition, filing and printing results, maintenance, troubleshooting, help suggestions, overpressure alarms, and data security.

The tests use a pump under computer control to provide water to a valve under test. A pressure sensor at the input of the valve under test measures the actual input pressure. The pressure sensor is calibrated by an separate external measuring unit. The pressure information from the pressure sensor is a computer input.

A manual test mode of operation permits the user to set the pressure input into a computer screen. An automatic test mode of operation permits the user to select one of several computer controlled predetermined pressure versus time profiles from a screen. These pressure versus time profiles are called pressure templates. Automated tests are repeated ten times with the results averaged for improved accuracy. Another mode of operation permits the user to review previously collected file data.

The output flow rate from the valve under test is determined by collecting liquid emerging from the valve in a container, and using a scale to continuously weigh the container and collected liquid. The scale output is a computer input. The valve liquid output flow rate is determined in the computer by subtracting successively measured weights to determine the quantity and using their respective measurement times to calculate the output flow rate.

Valve output flow rates over time, low flow pressure, full flow pressure, and closing pressures, are determined, flagged, recorded and displayed by the computer for each test.

An alarm system which indicates out of range conditions by a red color alerts the user to any out of range condition. Screen icons permit the user to test the alarm system test for proper operation, and operate an on-off switch for the pump.

A file generated for each test uses the serial number of the tested valve as the file name. A date-time stamp and a user name are entered into the file for each test. The user can retest a valve, and can review current and previous test results.

The pressure sensor calibration can be performed, and pressure template parameters plus other critical parameters can be changed by a test manager. An automatically generated password can provide restricted access to these functions. The user-password file and the log file are also protected by scrambling the data.

Maintenance and trouble shooting equipment, procedures and programs are also provided as part of this apparatus.

BRIEF DESCRIPTION OF THE DRAWINGS

Many of the attendant advantages of the present invention will be readily appreciated as the same becomes better understood by reference to the following detailed description when considered in connection with the accompanying drawings, in which like reference numerals designate like parts throughout the figures thereof and wherein.

DETAILED DESCRIPTION OF THE PREFERRED EMBODIMENT

Figure 1:
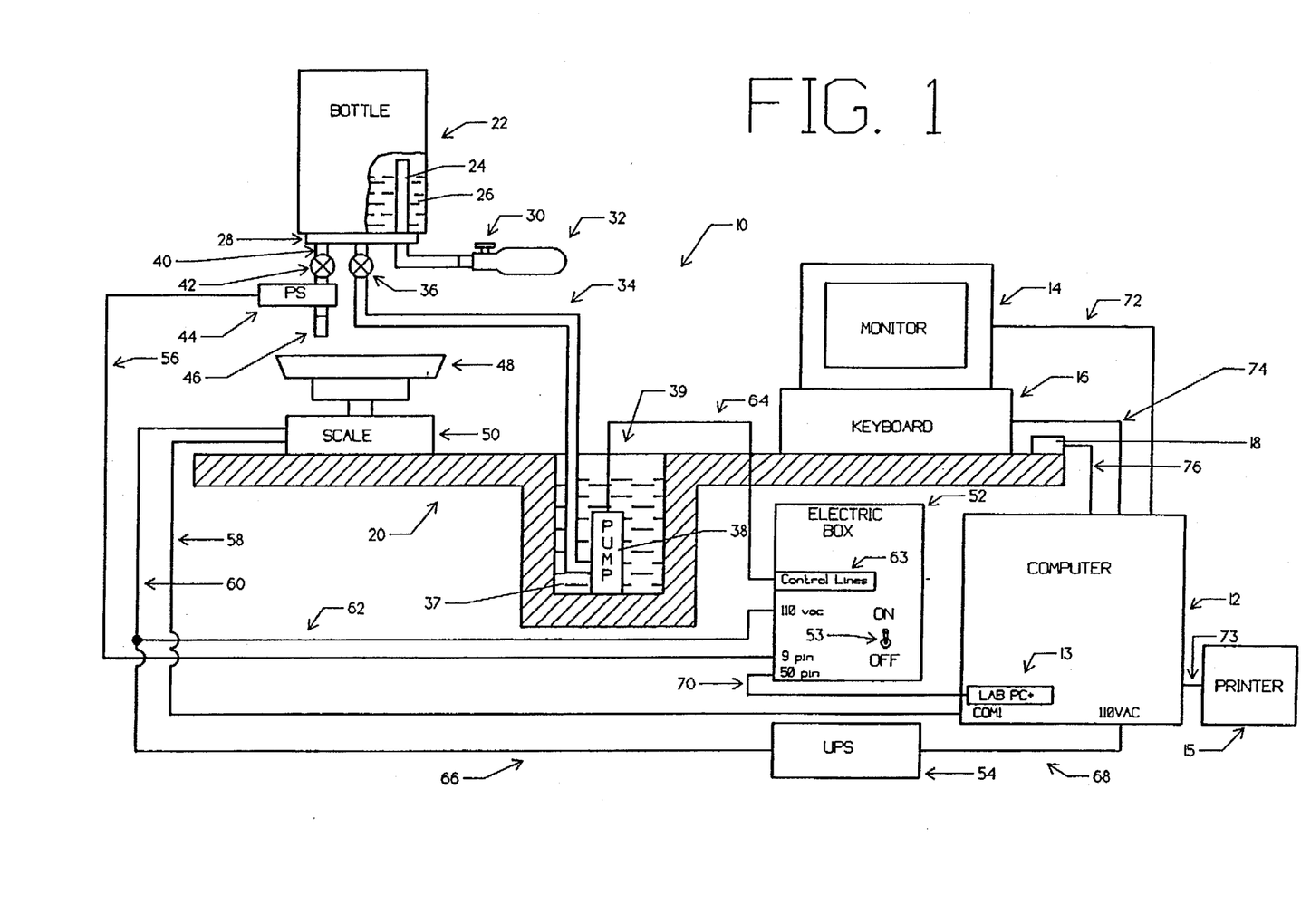
FIG. 1 is a side view of a physical arrangement of the apparatus.

The electrical and physical relationships of the various components of valve test apparatus 10 are shown in FIG. 1. Computer 12, which can include a Pentium™ microprocessor or other microprocessor as known in the computing art, uses appropriate microprocessor accessories, namely, an interfacing monitor 14, printer 15, keyboard 16 and mouse 18. Table 20 supports the majority of apparatus 10. An interface board 13, (LAB PC+ for the preferred embodiment) located within computer 12, provides additional necessary interface between the test apparatus and the computer.

Inverted bottle 22, supported above table 20, has a conduit 24 which extends from above the level of water 26 through stopper 28 to shut off valve 30 for hand air pump 32. Hand air pump 32 and shut-off valve 30 are used to manually change the level of working pressure within bottle 22.

Conduit 34 extends from within bottle 22, through stopper 28, into stop-cock 36, and then from the stop-cock to pump 38. Pump 38 is arranged to pump water 37, contained within recess 39 of table 20, into bottle 22 through conduit 34. A pump which can be used with this apparatus is model IPC13A manufactured by Beckett corporation, which operated on 110 vac. An I/O module 41, not shown on this figure, which is model SRA-01 manufactured by Keithley Metrabyte can provide a control interface to the pump. A high-flow check stop-cock manufactured by Resenex, not shown, prevents working fluid from discharging through the pump.

Conduit 40 extends from within bottle 22, through stopper 28, into stop-cock 42, and then from the stop-cock through pressure sensor 44 to valve 46, which is the valve under test. Stop-cocks 36 and 42 permit isolating bottle 22 from the remainder of the system for maintenance or part replacements. Pressure sensor 44 can be model PX139-005D4V manufactured by the Omega corporation or similar sensor as known in the sensor art.

Valve to test 46 is positioned immediately above upwardly open container 48 to allow the container to collect water flowing through valve 46. Container 48 is supported by scale 50, which is turn is supported by table 20. Scale 50 can be either a model LT7200 manufactured by ACCULAB, model TP4K manufactured by OHAUS or other scale having an output port which provides a continuous output representing the current weight on the scale.

A standard electrical receptacle provides 110 VAC power. Uninterrupted Power Supply (UPS) 54 is connected to said power source. UPS 54 provides conditioned power to the entire system. Electric box 52 and UPS 54 provide the necessary electrical connections and I/O (input/output) to interface computer 12 with pump 38, scale 50 and pressure sensor 44. Switch 53 switches a separate 110 vac power source to electric box 52 on and off. Fuse 55, not shown in this figure, provides 110 vac circuit protection. Pressure sensor 44 has a nine pin output channel to provide the sensed pressure information which is connected to a nine pin input channel in electric box 52 through connection 56. Scale 50 has an RS232 compatible output, which provides the weight information from the scale, to an RS232 compatible input COM1 serial port in Computer 12 through connection 58. Scale 50 also has a connection 60 to connection 66 which is also connected to the 110 VAC power source from UPS 54. This power source provides the electric power for scale 50.

Pump 38 receives its power from control lines 63 in electric box 52 through connection 64 which is controlled by computer 12, as will be described later. Connector 62, connected to 110 vac in electric box 52, which is switched by switch 53, is also connected to connector 66 to provide 110 VAC power from UPS 54. UPS 54 also provides 110 VAC power to computer 12 through connector 68. Electric box 52 has a 50 pin connection data acquisition board LAB PC+ 13 through connector 70 to computer 12.

Monitor 14 is connected to computer 12 through connection 72. Printer 15 is connected to computer 12 through connection 73 directly or through a network. Keyboard 16 is connected to computer 12 through connection 74. Mouse 18 is connected to computer 12 through connection 76.

These connections are all conventional for microprocessor computers with the appropriate number of lines and interface arrangements.

Figure 2:
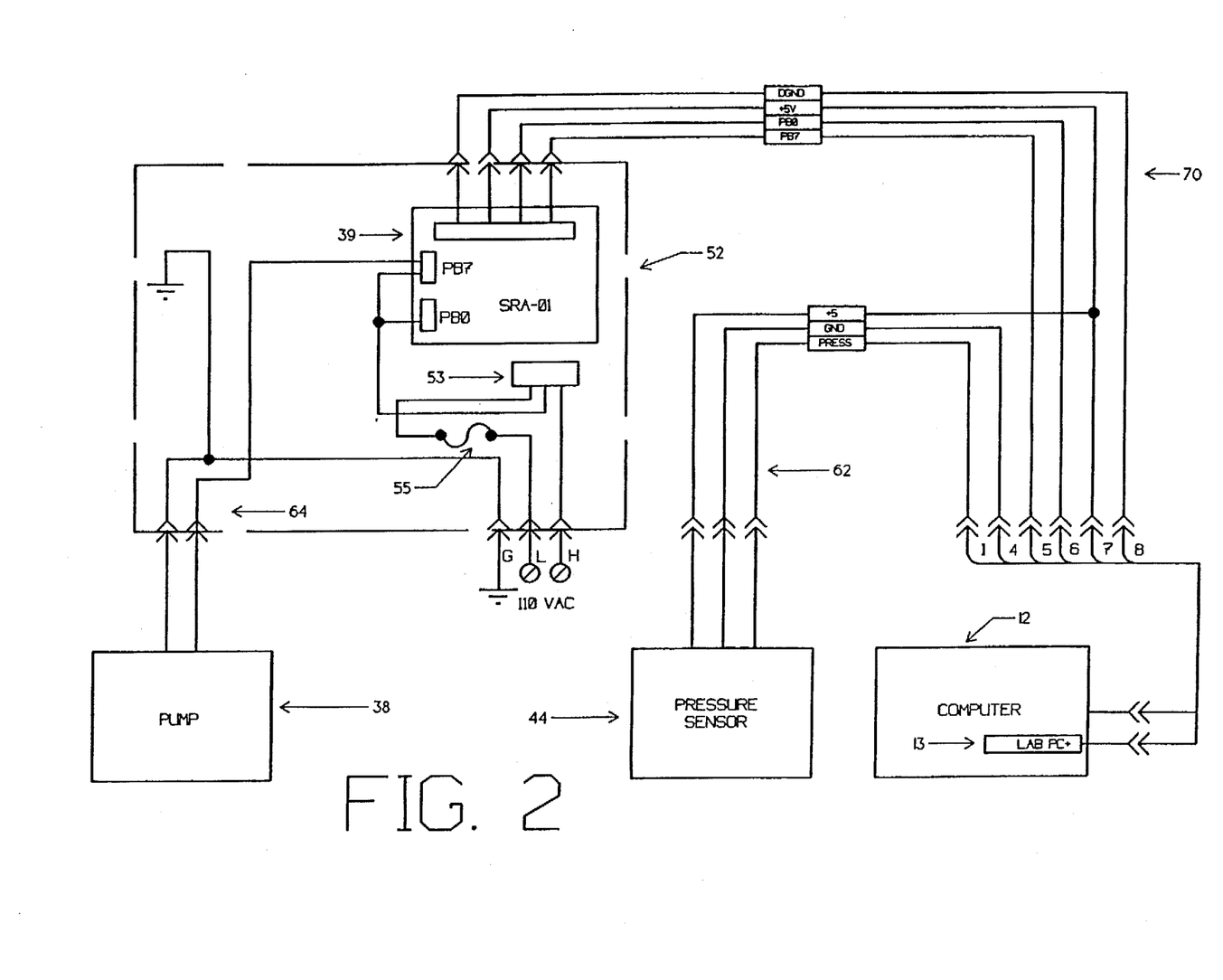
FIG. 2 is a block diagram of the control schematics of the apparatus.

FIG. 2 shows details of the data acquisition and control schematics for pump 38 to electric box 52 containing I/O module 41, switch 53, fuse 55 and the connections of the module and pressure sensor 44 to computer 12 containing interface card 13.

MENU CONTROL

The above described hardware is controlled through a graphical user interface which includes menu selections and screen controls on numerous forms. These screen selections are all called using labeled buttons or icons using the mouse or keyboard. The above operations are all called from screens using the familiar hypertext and/or Windows procedures and their control capabilities. These are familiar to those skilled in contemporary computer art. The screen selections in turn call up corresponding computer programs which perform the selected operation. Specific programs necessary to provide these various operations are not included, however the knowledge of how to provide such programs using common computer instructions and approaches from the following descriptions of their operations is well known in the computer art.

The menu selections which are available, and which can be called in the manner described above, consists of the following:

File: New, Open, View, Save, Exit
Edit: Entry, Password
Maintenance: Pressform, Limits, CalibrationPress, Scale_RS232, IDs, Username, Logon
Help

FILE OPERATIONS

File deals with creating and reading experimental files.
File/New starts a new experiment and is a default setting.
File/Open reads an old file from specified data directories.
File/View allows the user to move back and forth in an opened file and to review the graphs of pressure and flow for a particular cycle.
File/Save creates an experiment file.
File/Exit closes the program.

The above programs are all started through the File/New screen. As an example, if the user then wants to reach the File/Old function by selecting a File/Old button in the File/New screen, then all the controls which allow the user to manage an experiment will be blocked and a form will pop up on the screen for navigating through cycles of the selected file. Pressure and flow rate graphs or a test Summary can also be called from these screens. When viewing the pressure and flow rate graphs or Summary the navigational form disappears. These can be restored by selecting a File/View button. After File/Open has been selected, the user must select the File/New button to continue an experiment.

EDIT OPERATIONS

Edit allows a user to change the input information.
Edit/Entry enables the user to change the serial number and the part number of the device.
Edit/Password allows the user to change their own password. When the user selects the Edit/Entry button, the entry form is shown which permits changing the serial and part numbers of the device under test from the default entries provided by the program. If, in a new experiment, the user forgets to select Edit/Entry they will be prompted to enter this information into Input boxes provided before they can proceed with the test. A new user will automatically receive a standard password and the system will prompt the user to change the password every time that password is sensed.

MAINTENANCE OPERATIONS

Preferably, maintenance is accessible only by a test manager and not by the usual user. A maintenance screen can only be called up by using an appropriate manager identification code.

Maintenance/Pressform allows the manager to change the pressure template. The pressure template specified is a polylinear function of pressure versus time with Vertices (0,0; X1,P1; X2,P2; X3,0; X4,0) where X1 . . . X4 are in seconds and P1, P2 are in cm. of water. The total cycle time is X4 seconds.

Maintenance/Limits allows the manager to change limits for the low flow pressure, full flow pressure, closing pressure, test points and for a minimum of the maximum flow rate.

Maintenance/CalibrationPress allows the manager to calibrate the pressure, sensor, update the pressure sensor coefficients and print a calibration report.

Maintenance/IDs allows the manager to change identification numbers for the test station, for the pressure sensor and for the scale.

Maintenance/Username enables the manager to review, add or delete user names.

Maintenance/Logon allows the manager to review a log on file.

HELP OPERATIONS

The Help screen provides suggestions for troubleshooting the apparatus.

MAIN FORM SCREEN

The Main Form screen, shown in FIG. 3, is used to operate the tests (the Main Form screen can also include the Menu Control described above). The Main Form screen displays the below named control buttons which provide the named operation when "clicked" on by the mouse. The user calls this screen to control either a single manual test or for an automated test of the valve. This screen controls a VisualBasic program PRTEST01.EXE which in turn uses a number of additional programs located in the work directory c:\vb\lab\testtn. These additional word directory programs will be described later under Files. The control buttons displayed by the Main Form screen and the corresponding operations follow.

Go: Starts a single cycle of the experiment. This command is used for manual user control of the experiment.

Back: Allows the user to repeat the last cycle of a test, or to start a test from the beginning, or to exit the program depending upon the status of the test.

Auto: Automatically changes the test procedure from an existing cycle to an automatic 10 cycle test. Prior to calling up this control the user should operate the test at least one cycle manually.

Pump: Provides user control to toggle the pump on and off when the user needs to refill bottle 22.

Pressure: Displays the pressure graph for the current test cycle in a larger size format to allow zoning the test times.

Flow: Displays the flow rate graph for the current test cycle in a larger format to allow zoning the test times.

Figure 4:
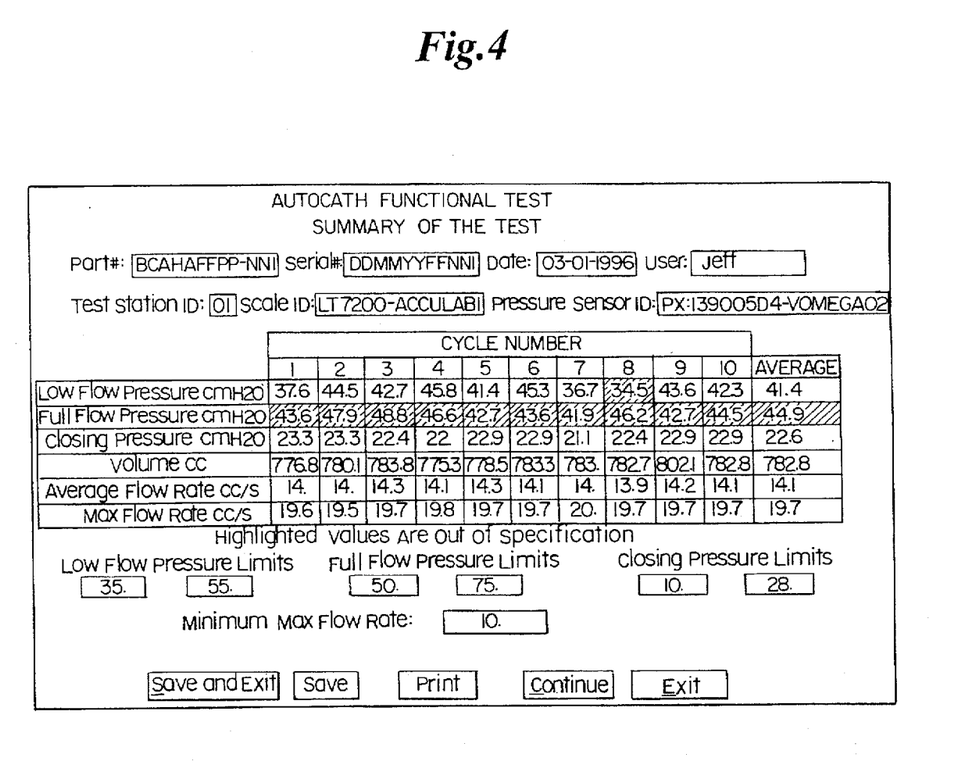
FIG. 4 is a test summary which provides a screen for observing test results.
Figure 5:
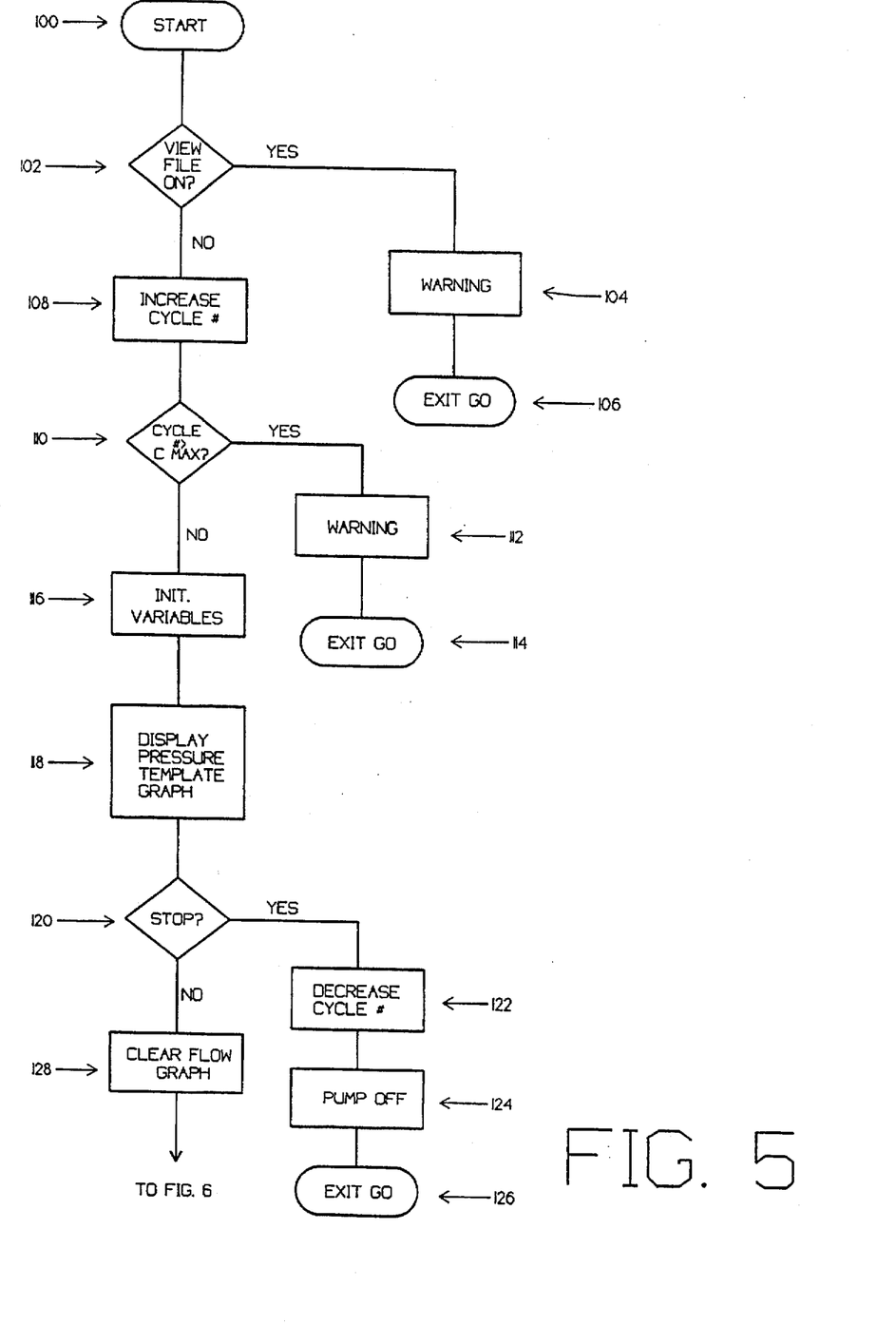
FIGS. 5, 6, 7 and 8 are flow diagrams showing the test process.
Figure 6:
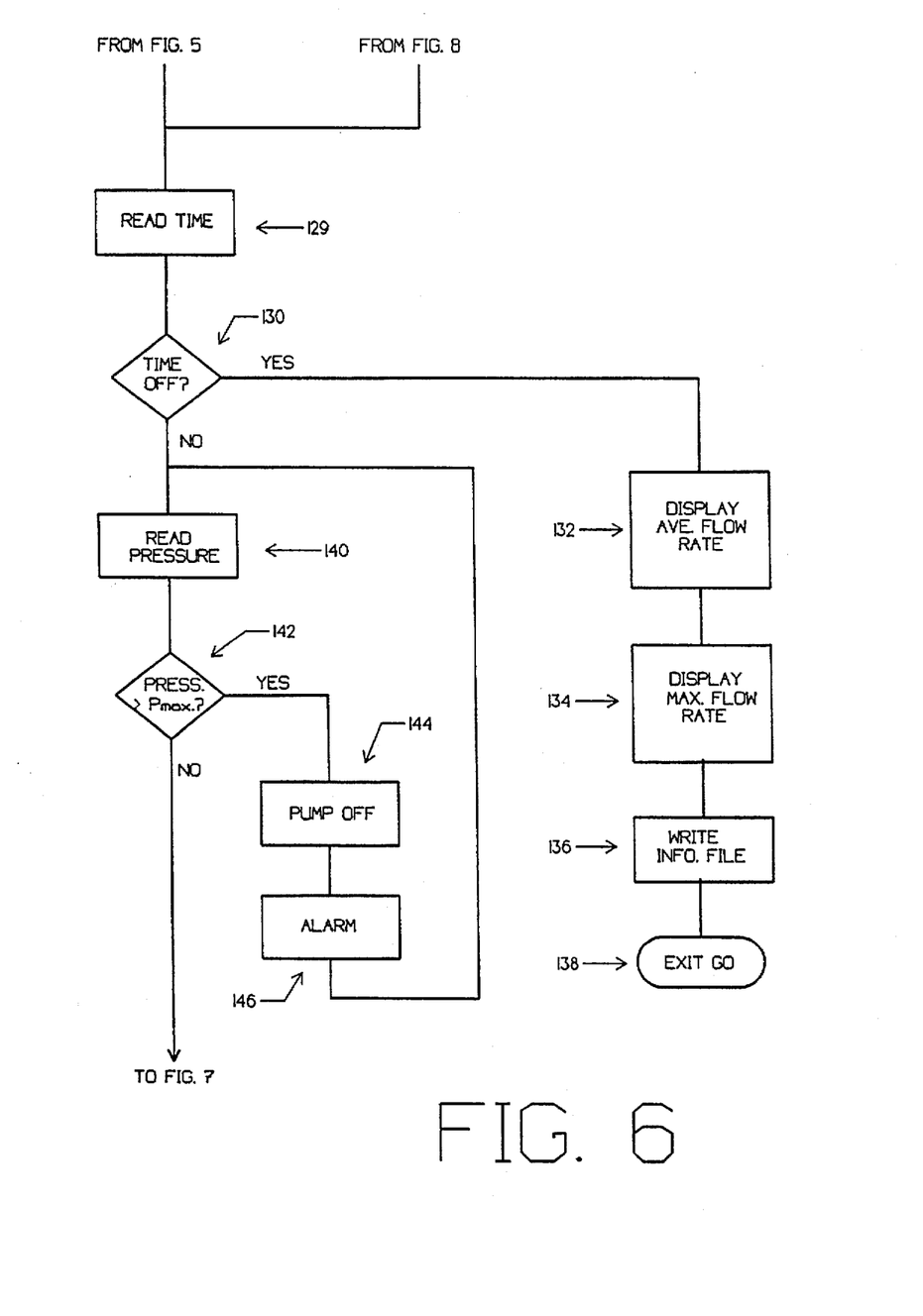
Figure 7:
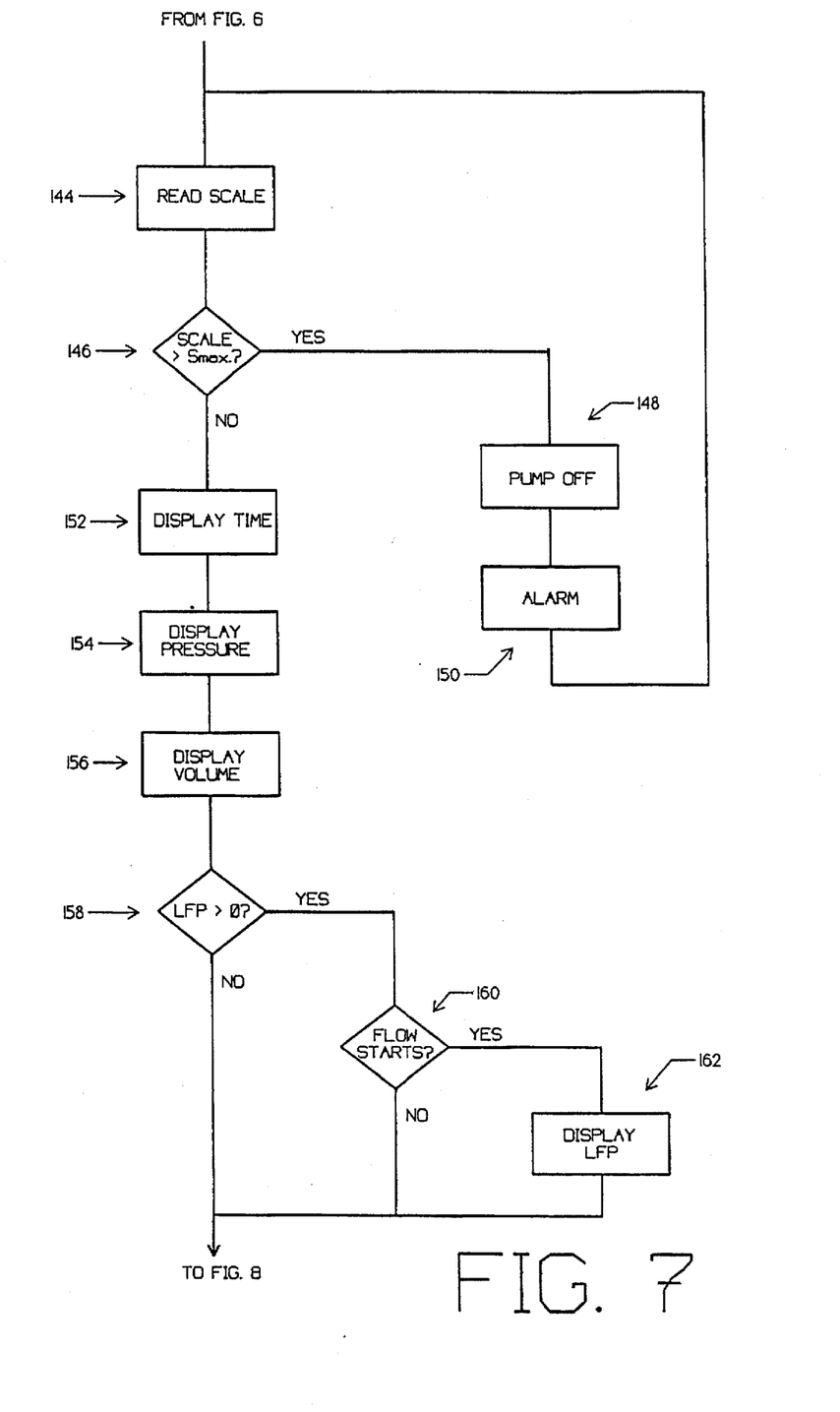
Figure 8:
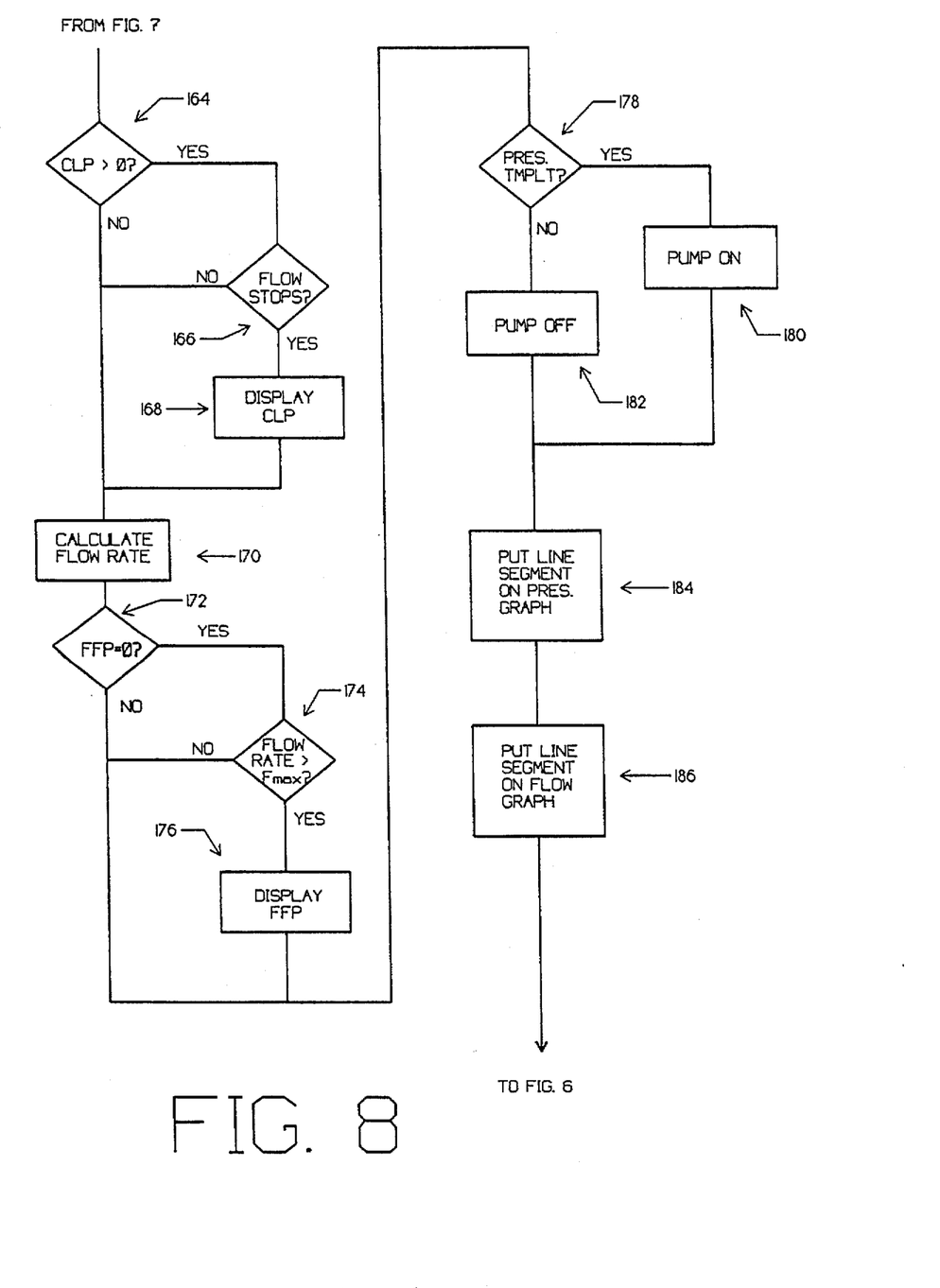
Figure 9:
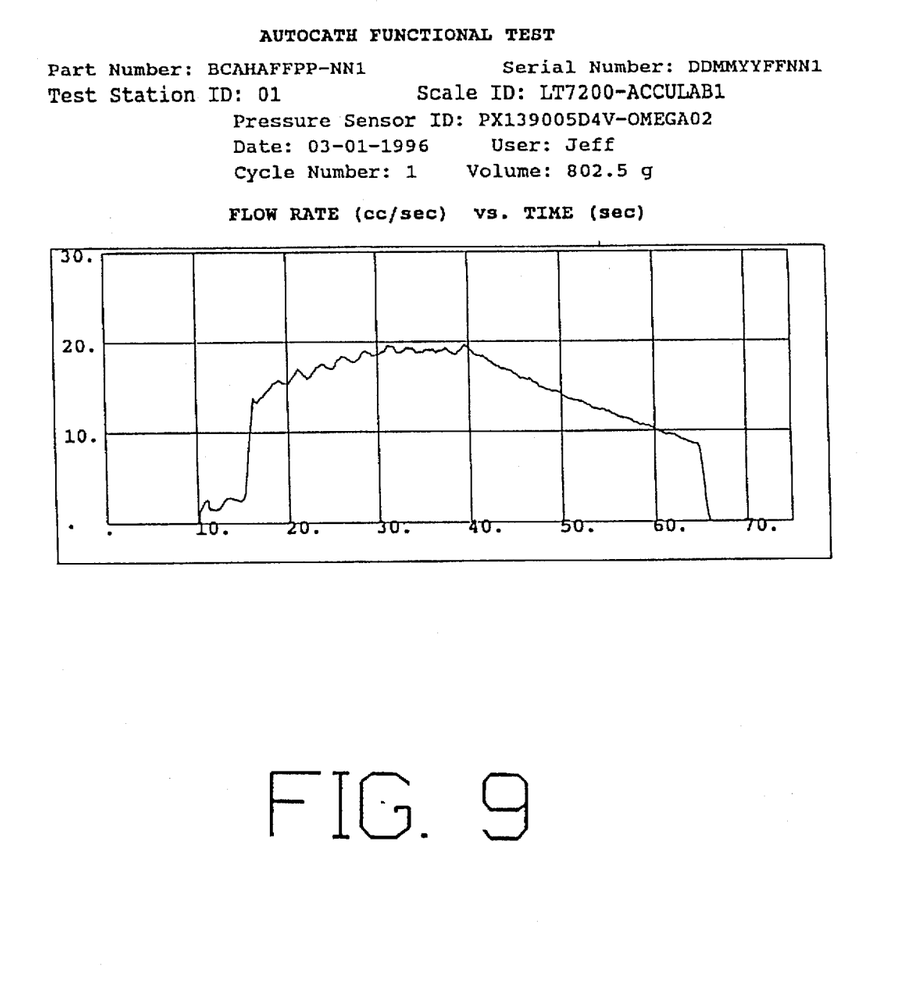
FIGS. 9 and 10 illustrate the results of two different valve tests.
Figure 10:
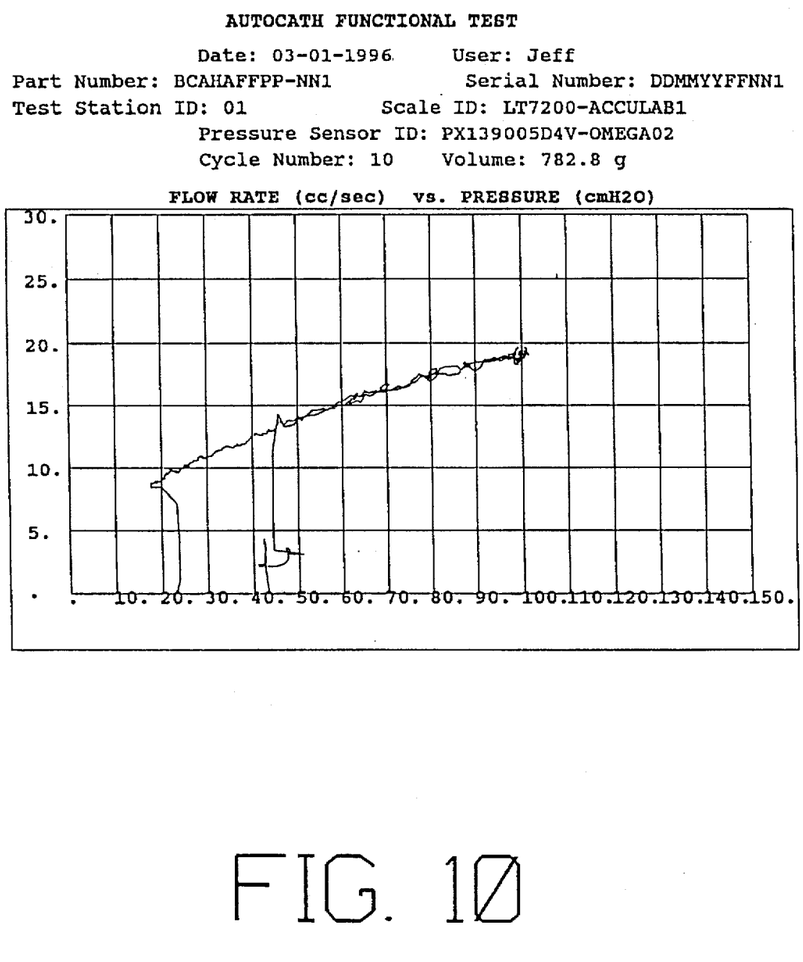

Summary: Displays a summary of finished test cycles which also provides the buttons and functions of save, file, print, continue or exit. This screen is labeled "Summary of the Test" and is shown in FIG. 4.

FloPrs: Allows the user to view and print the Flow versus Pressure graph for the current cycle.

Exit: Exits from the test at that point.

Restart: Restarts a test from the point exited.

Save: Saves the test results to a file.

File/Newmenu: Initiates a new file and test.

File/Exit: Exits from the test and saves the results to the file.

FIGS. 3A–3D show the Main Form including first through fourth sample test cycles. The first test cycle is almost complete at 58 seconds. No average flow rate or max flow has been computed as the cycle is not complete. The second sample test cycle is a complete test at an elapsed time of 60 seconds. Volume, average flow rate and max flow rate have been computed. The third test cycle, like the first test cycle, is not yet complete at an elapsed time of 59 seconds and, thus, average flow rate or maximum flow rate have not been computed. The fourth sample test cycle is substantially incomplete at an elapsed time of 26 seconds. The valve has not yet closed and thus no closing pressure has been determined as well as no average flow rate or max flow rate.

SUMMARY OF THE TEST

The Summary of the Test of FIG. 4 shows the corresponding screen menu called by clicking on Summary in the Main Form screen. This summary has data boxes along the top of the screen with identifying labels for Part #, Serial #, Date, User, Test Station ID, Scale Id, and pressure Sensor ID.

Immediately below these data boxes information regarding Data for the Low Flow Pressure, Full flow Pressure and Closing Pressure in cm. of water are also shown for each cycle number and for a 10 cycle average. The data indicates Volume in cubic cm. Average Flow Rate and Max. Flow Rate are shown, for each cycle and the average of the data for the 10 cycles, in cubic cm. per second.

Three pairs of data boxes are provided. One pair of boxes is provided for upper and lower limit information of Low Flow Pressure Limits, Full Flow Pressure Limits, and Closing Pressure Limits. A single box is provided for Minimum Max. Flow Rate data.

Buttons along the bottom of the screen labeled: Save and Exit, Save, Print, Continue and Exit provide these indicated operations when "clicked" upon by the mouse, or by typing either the first letter of the label or, if a letter in the label is underlined, typing the underlined letter.

ALARMS

The main control screen also displays four alarms which indicate out of range conditions for Pressure, Pump, Temperature and Scale. An alarm condition is indicated when the display is red. The alarm can be turned off only by clicking on the indicated alarm.

SECURITY SYSTEM

The security system includes password access and a Logon file. A user accesses the program by entering his or her own user name and password. These are contained in a file Passuser.fil, which will be described later along with the other files. This file is scrambled for security considerations. This file excludes all except identified managers from the Maintenance operations. Since every user has his or her own password, no one can log into the system as someone else.

Every time a user logs into the system, a new record is generated which includes a date-time stamp and the user name.

FILE SYSTEM

When 10 cycles of the test have been performed the program can generate an experiment file to save the data. This can be accomplished from File/Save in the Main Form screen or from Summary by selecting Save or Save-Exit buttons.

A file name is generated automatically from the serial number of the device. If the serial number of the device is MMDDYYFFNNN, the file name will be MMDDYY-FF.NNN. The user should confirm that these are identical before saving or transferring the test file.

Each experiment file includes 200 bytes of data plus the device ID, summary information of the tests, and 10 sets of record for 10 cycles. The first field of 5 characters of the file is made the same for all of the experiment files, so the program can recognize experiment files and immediately reject all others.

The number of records can vary from set to set although the total cycle time is determined by the value of X4 in the pressure template. Every record in a set is 8 bytes long consisting of time in milliseconds, pressure and flow rate. Time is saved as a 4 byte integer. Pressure and flow rate are saved as integers with a scale of ten, i.e., a pressure of 53.2 cm. of water is saved as 532 to reduce the file size.

FILES

The files which the Main Form screen program PRT-EST01 requires to be located in work directory C:\vb\lab\teststtn follow:

Passuser. fil This file contains the user names and passwords and is scrambled.

Logon.fil This file contains logon records of user names and date-time stamps and is scrambled.

PresTmp.fil This file contains the pressure template.

Alimits. fil This file contains limits for the low flow and full flow pressure, the closing pressure, maximum weight on the scale and other limits.

Commparm.fil This file contains communication parameters for the RS-232 port of scale 50.

Prescalb.fil This file contains pressure sensor coefficients.

A special directory is also required for the experimental files, namely: c:\vb\lab\testdata.

MAIN FORM FLOW CHART

Program flow diagrams showing the results of using the various buttons of the Main Form screen of FIG. 3 are shown in FIGS. 5, 6, 7 and 8. Abbreviations used on these figures are: LFP=Low Flow Pressure; FFP=Full Flow Pressure; CLP=Closing Pressure.

"Clicking" on GO on the Main Form, shown in FIG. 3, calls up programs which providing the testing functions. During the entire time these programs are operated, a continuous output from the scale 50 provides quantity information and time, input in milliseconds, permits calculating flow rate. A moving average over a 55 ms. interval avoids the discrete nature of time in the Windows operating system. Opening and closing of the valve is obtained by the comparison of three consecutive scale readings. Full flow pressure is determined if the flow rate exceeds a predetermined flow rate. An average flow rate is determined by dividing the total volume by the time interval between the valve opening and closing.

By clicking on Go, the program flow diagram shown in the above figures, is entered at the first block Start 100, which then enters block View File On? 102. If the view file is on, the answer to block 102 is Yes, and block Warning 104 is entered which displays a warning on the screen and then enters block Exit Go 106 which returns the program to Go awaiting further user intervention. If the answer to block 102 is No then block Increase Cycle # 108 is entered which increments the test cycle number upward by one and enters block Cycle #>C Max.? 110.

If the cycle number of the current test cycle is greater than CMAX (which was 10 for the preferred embodiment), the answer to block 110 is Yes, and block Warning 112 is entered which displays a warning on the screen and then enters block Exit Go 114 which returns the program to Go awaiting further user intervention. If the answer to block 110 is No, then Initiate Variables 116 is entered which enters the selected pressure template sequence and then enters block Display Pressure Template Graph 118 which displays the selected pressure template and then enters block Stop 120 which determines if stop has been selected.

If the answer to block 120 is Yes, then Decrease Cycle # 122 is entered which decrements the cycle number by one and then enters block Pump Off 124, which stops the pump and then enters block Exit Go 126, which returns the program to Go awaiting further user intervention.

If the answer to block 120 is No then block ClearFlow Graph 128 is entered which clears the graph and enters block Read Time 129 which reads the current time and enters block Time Off? 130. If the time to complete the test has been reached then the answer to block 130 is yes and block Display Ave. Flow Rate 132 is entered. Block 132 displays the average flow rate on the screen and enters block Display Max. 134.

Block Flow Rate 134 displays the maximum flow rate on the screen and enters block Write Info. File 136, which writes the test information to the current test file. Block Exit Go 138 is then entered which returns the program to Go awaiting further user intervention.

If the answer to block 130 is No, then Read Pressure 140 is entered which reads the current from pressure sensor 44 and then enters block Press >Pmax.? 142. If the current pressure read is greater than the allowed pressure maximum, the answer to block 142 is Yes, and block Pump Off 144 is entered which shuts the pump off and enters block Alarm 146. Block 146 sets an alarm on the screen indicating pump overpressure and reenters block 140.

If the answer to block 142 is No, then block Read Scale 144 is entered which reads the current scale information from scale 50 and enters block Scale >Smax.? 146. If the weight currently indicated by the scale is greater than the maximum scale weight limit the answer is Yes and block Pump Off 148 is entered. Block 148 shuts the pump off and enters block Alarm 150. Block 150 provides an alarm on the screen indicating that the weight of the scale is over limit and reenters block 144.

If the answer to block 146 is No, then block Display Time 152 is entered which displays the current time on the screen and enters block Display Pressure 154. Block 154 displays the current pressure on the screen and then enters block Display Volume 156. Block 156 displays the current flow volume and enters block LPF >0? 158. If the low flow pressure is greater than zero, then the answer to block 158 is Yes and block Flow Starts? 160 is entered.

If flow has started, as indicated by an increase in readings from scale 50, the answer to block 160 is Yes and block Display LFP 162 is entered. Block 162 displays the low flow pressure on the screen and enters block CLP >0? 164. If the answer to block 160 is No, block 164 is entered. If the answer to block 158 is No, block 164 is entered.

In block 164, if the closing pressure of the valve under test is greater than zero the answer is Yes and block Flow Stops? 166 is then entered. In block 166 if the flow through the valve under test has stopped, as determined by no change in the weight on scale 50 for successive readings, the answer is Yes which indicates that the valve has closed. Block Display CLP 168 is then entered which displays the closing pressure on the screen and enters block Calculate Flow Rate 170. If the answer to block 164 is no block 170 is entered.

The flow rate is calculated in block 170 by subtracting the weights on scale 50 at successive reading times to determine the weight of flow, converting weight to quantity, and using the time of the readings to determine the flow rate.

Block 170 then enters block FFP =0? 172. If the full flow pressure through the valve under test is equal to zero the answer is Yes and block Flow Rate >Fmax.? 174 is entered. If the flow rate, determined in block 170, is less than the maximum flow rate for the valve the answer is Yes and block Display FFP 176 is entered. Block 176 displays the full flow pressure of the valve on the screen and enters block Pres. Tmplt? 178. If the answer to block 172 or 174 is No, block 178 is entered.

If a pressure template has been specified, the answer to block 178 is Yes and block Pump On 180 is entered. Block 180 turns the pump on and enters block Put Line Segment on Pres. Graph 184. If the answer to block 178 is No block Pump Off 182 is entered. Block 182 turns the pump off and enters block 184.

Block 184 places the line segment for the pressure just calculated on the monitor and enters block Put Line Segment on Flow Graph 186. Block 186 places the line segments for the flow rate just calculated on the monitor and reenters block 129.

This arrangement will test a valve once if no template is provided and will repeat a valve test 10 times if a pressure template is provided. At the end of the tests the test parameters will be displayed on the screen of monitor 14 and collected in an identified file.

OPERATING PROCEDURE

Figure 3A:
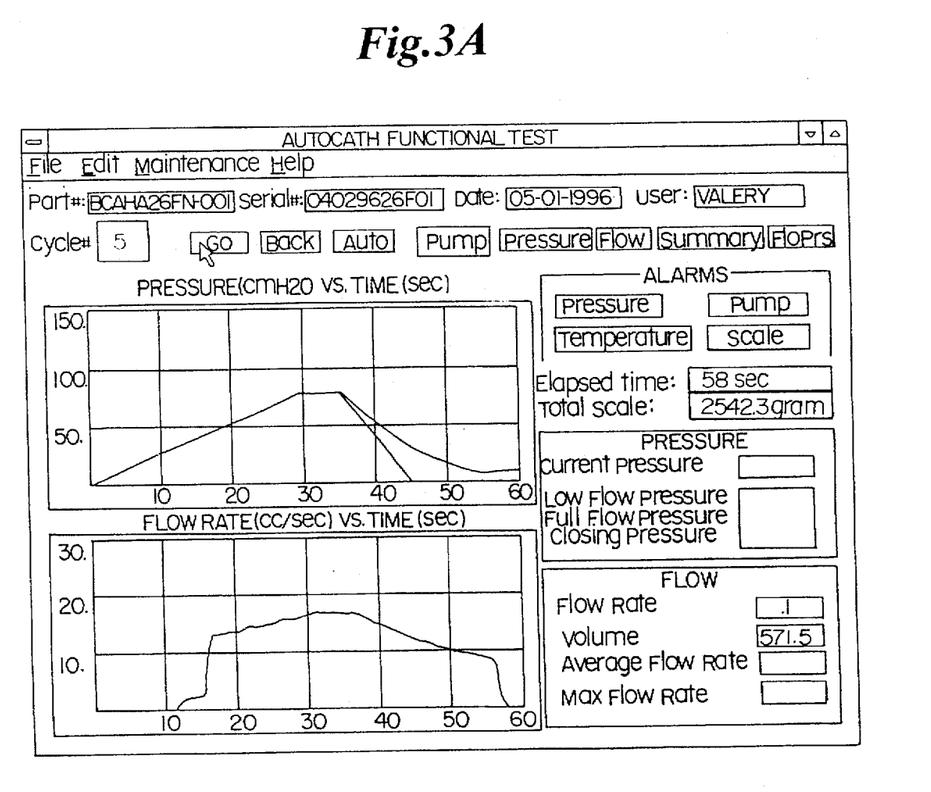
FIG. 3A is a Main Form which provides the screen for overall test control operation showing a first sample test cycle.
Figure 3B:
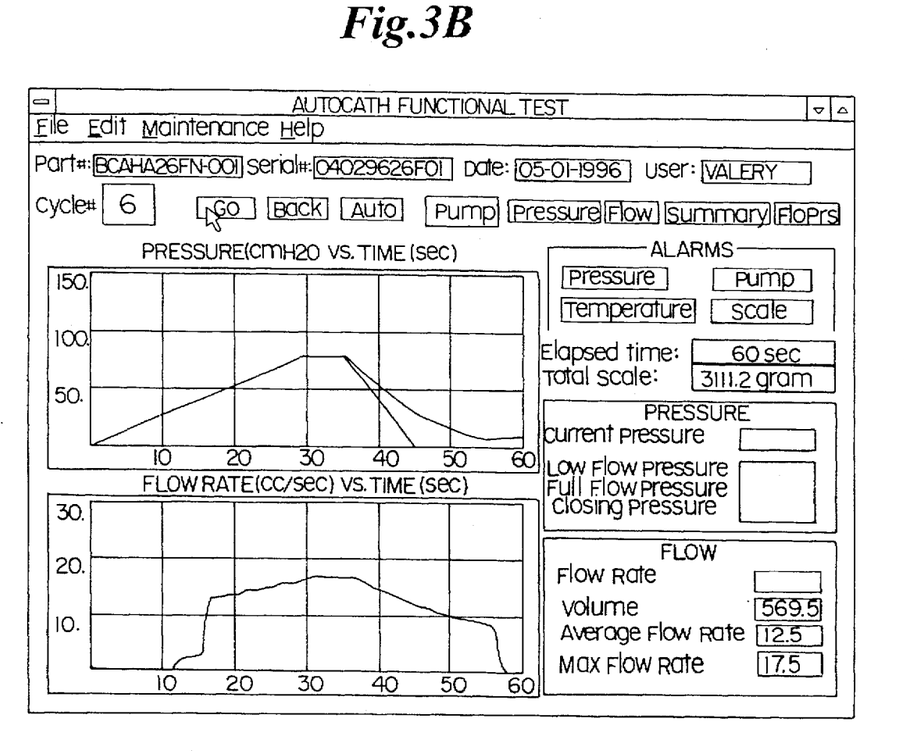
FIG. 3B is the Main Form showing a second test cycle.
Figure 3C:
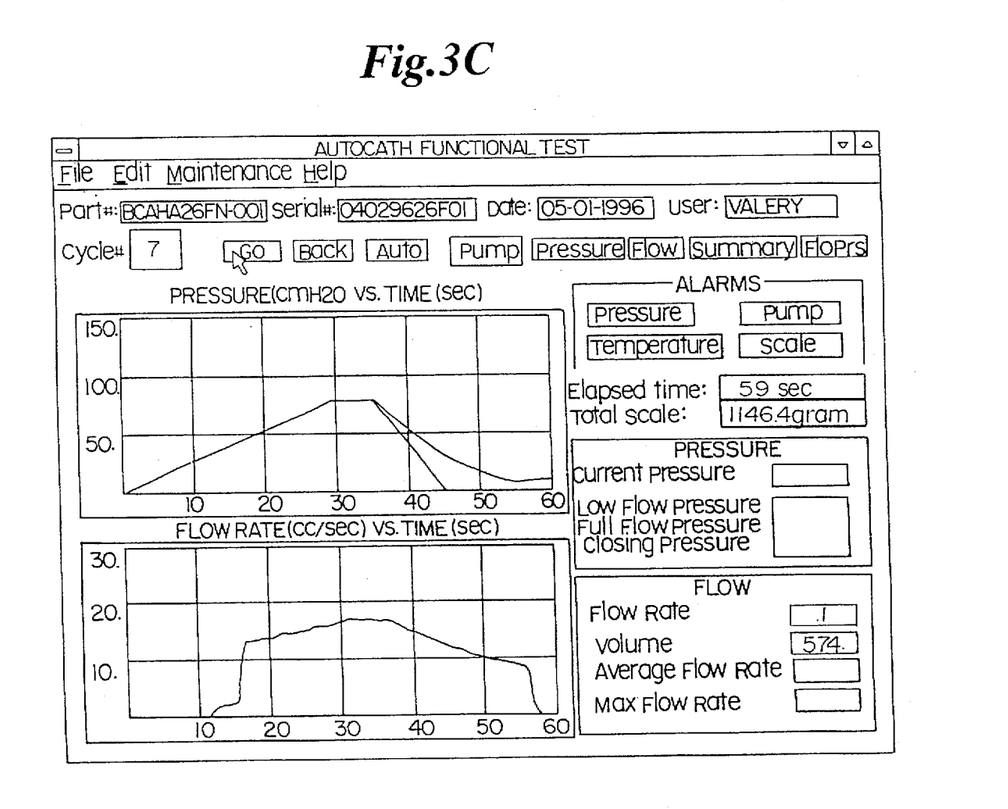
FIG. 3C is the Main Form showing a third test cycle.
Figure 3D:
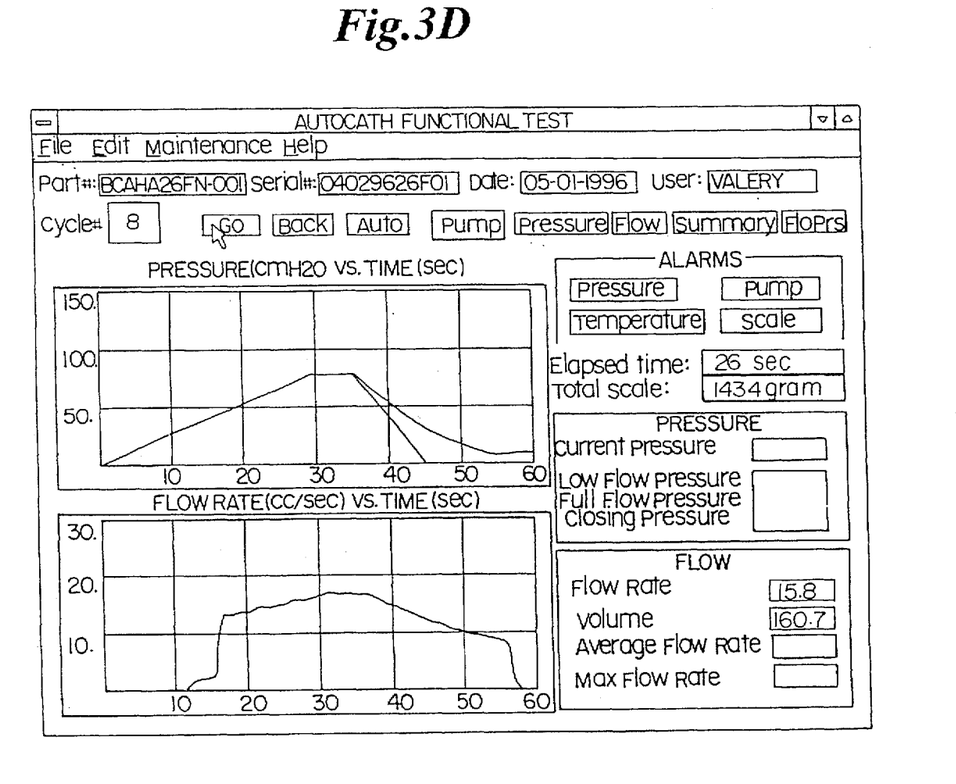
FIG. 3D is the Main Form showing a fourth test cycle.

Assuming that the apparatus is completely powered down, a user must follow the following steps to perform a test on a valve:

1. Remove container 48 from scale 50.
2. Turn computer 12 off and switch 53 on. Make sure that zero initially appears on its read-out.
3. Replace container 48 on scale 50.
4. Turn on computer 12, call up and double-click on an icon labeled "Production Test" which will call up the Main Form of FIG. 3.
5. Turn on switch 53 on electric box 52.
6. Enter your user name and password in the appropriate boxes on the Main Form.
7. Connect the valve 48 under test to apparatus 10.
8. Select Edit/Entry from the Main Form and enter the part number and the device serial number. If this is overlooked the system will prompt the user for this information.
9. Click on Go on the Main Form to initiate the test and observe the pressure and flow rate for the test.
10. If the pressure and flow rate appears normal click on Summary on the Main Form to obtain a Summary of the Test results, as shown in FIG. 4. The user can click on the Pressure, Flow or FloPrs buttons instead to review and print an enlarged graph for this cycle on printer 15.
11. If no alarms are shown to indicate something out of range click Continue then Go to go through the test cycles one by one manually, or click Auto button to go through the test cycles automatically. A good procedure is to wait until at least two cycles which appear to be correct have been tested manually to make sure that the valve under test and the apparatus operates correctly, then click on Back and then click on Restart to begin then 10 cycles for filing. The first cycle can again be done manually and the remainder automatically.
12. Click on the Summary button again to review the Summary of the Test for the complete ten cycles.
13. If no Alarms indicate any quantity out of limits, click on the Save button to generate a file for the complete test and to start another test by selecting File/New Menu and repeating this processor from step 7 above, or by clicking on Save and Exit if this is the last test. If an Alarm condition indicates something out of limits, click Exit to terminate the test and reject the valve under test or click on the Continue, Back, and Restart buttons in sequence to repeat a 10 cycle valve test. Again the first test cycle should be performed under manual direction and the remaining 9 tests under Auto control. as described above.
14. To end testing exit the program by clicking on File/Exit, closing valve 42, removing the valve under test, and turning off switch 53 on electric box 52. This last step is required because otherwise, with valve 42 closed when computer 12 is reenergized pump 38 could build up a substantial pressure in bottle 22.

This apparatus provides a standardized repeatable test procedure which is stored in a standard format. Flexible controls to monitor and modify the tests are available in screen menu formats using standardized conventional computer techniques. Previous test results can readily be recalled and observed. The computer, its accessories and operating system are standardized and readily available. Only the test equipment itself and necessary computer interface are specialized but here too the operation is controlled by the standardized operating system. This greatly reduces both equipment and training costs.

While this invention has been described with reference to an illustrative embodiment, this description is not intended to be construed in a limiting sense. Various modifications of the illustrative embodiment, as well as other embodiments of the invention, will be apparent to persons skilled in the art upon reference to this description. It is therefore contemplated that the appended claims will cover any such modifications or embodiments as fall within the true scope of the invention.

What is claimed is:

1. An apparatus comprising:
   a) a device for controlling urinary incontinence; and
   b) a tester responsively coupled to said device for determining that said device opens at a first predetermined pressure and remains open above a first predetermined flow rate.

2. Apparatus as in claim 1 wherein said device comprises a valve and wherein said tester comprises:
   a) computer means for receiving data from external measurements, for providing test functions, for providing user control, and for determining and providing output control signals based on said test functions, said received data and said user control;
   b) pump means for providing liquid to said valve at pressures determined by said computer means output control signals;
   c) pressure measurement means for determining said pump means output pressure and providing said measurements to said computer means;
   d) quantity measurement means for measuring the quantity of fluid flowing through said valve as a function of time and providing said measurements to said computer means.

3. Apparatus as in claim 2 and further comprising:
   a) monitor display means for displaying test information to the user;
   b) file recording means for recording files of test information; and
   c) printing means for printing test information.

4. Apparatus as in claim 3 wherein said test functions comprise:
   a) predetermined profile means which specify a predetermined profile of pressure versus time test for said valve; and
   b) first control means for allowing the user to provide a single predetermined profile test of said valve.

5. Apparatus as in claim 4 wherein said test functions further provide second control means for allowing the user to provide a multiple of predetermined profile tests cycles of said valve.

6. Apparatus as in claim 4 or 5 wherein said predetermined profile test cycles comprises a polylinear function of pressure versus time includes a plurality of linear line segments.

7. Apparatus as in claim 5 wherein said computer further has means to average the results of said multiple profile test cycles.

8. Apparatus as in claim 3, 4, or 5 wherein said computer means further has means to automatically assign a test station identification number, a user identification number and a valve identification number to each file for each test station, each user and each valve under test, and to record the date and time each test was performed as part of each file.

9. Apparatus as in claim 8 further having means for determining which users are also managers.

10. Apparatus as in claim 9 having means for allowing any user to change selected identification numbers and allowing managers only to change all identification numbers.

11. Apparatus as in claim 8 further having calibrating means for calibrating said pressure measurement means being restricting to managers only.

12. Apparatus as in claim 11 further having means for specifying the test points for said valve for said predetermined pressure and time range being restricted to managers only.

13. Apparatus as in claim 9 also having means for managers only to specify out of range test conditions; and having alarm means for indicating any out of range conditions to a user; and further having means for a user to turn said alarm means indication off.

14. Apparatus as in claim 3 said computer having means for allowing a user to review a previous test file.

15. Apparatus as in claim 4 or 5, said computer having means for repeating any one of a previous test cycles.

16. Apparatus as in claim 8 wherein said quantity measurement means comprises a scale, and wherein said means for providing said quantity measurements to said computer comprises an RS-232 output means having means for changing communication parameters.

17. Apparatus as in claim 16 wherein changing communication parameters is restricted to managers only.

18. Apparatus as in claim 4 in which said monitor means has screen means for displaying control menus to designate control functions for said computer; said computer having selection means to designate particular menu titles and to select control functions under each menu title.

19. Apparatus as in claim 18 having a menu for controlling the tests comprising control functions for:
a) starting a single test cycle of a test;
b) repeating the last cycle;
c) repeating a test a multiple of times;
d) toggling the pump means on or off;
e) displaying a summary of completed cycles; and
f) viewing and printing the test results for the current test cycle.

20. Apparatus as in claim 19 having further screen means for displaying a summary of a complete test.

21. Apparatus as in claim 6 wherein said computer further has means to average the results of said multiple profile test cycles.

22. Apparatus as in claim 5 in which said monitor means has screen means for displaying control menus to designate control functions for said computer; said computer having selection means to designate particular menu titles and to select control functions under each menu title.

23. Apparatus as in claim 22 having a menu for controlling the tests comprising control functions for:
a) starting a single test cycle of a test;
b) repeating the last cycle;
c) repeating a test a multiple of times;
d) toggling the pump means on or off;
e) displaying a summary of completed cycles; and
f) viewing and printing the test results for the current test cycle.

24. Apparatus as in claim 23 having further screen means for displaying a summary of a complete test.

25. Apparatus as in claim 9 in which said monitor means has screen means for displaying control menus to designate control functions for said computer; said computer having selection means to designate particular menu titles and to select control functions under each menu title.

26. Apparatus as in claim 25 having a menu for controlling the tests comprising control functions for:
a) starting a single test cycle of a test;
b) repeating the last cycle;
c) repeating a test a multiple of times;
d) toggling the pump means on or off;
e) displaying a summary of completed cycles; and
f) viewing and printing the test results for the current test cycle.

27. Apparatus as in claim 26 having further screen means for displaying a summary of a complete test.

* * * * *